US011469420B2

(12) United States Patent
Takahashi

(10) Patent No.: US 11,469,420 B2
(45) Date of Patent: Oct. 11, 2022

(54) BINDER COMPOSITION FOR NON-AQUEOUS SECONDARY BATTERY ELECTRODE, SLURRY COMPOSITION FOR NON-AQUEOUS SECONDARY BATTERY ELECTRODE, NON-AQUEOUS SECONDARY BATTERY ELECTRODE, NON-AQUEOUS SECONDARY BATTERY, AND METHOD OF PRODUCING NON-AQUEOUS SECONDARY BATTERY ELECTRODE

(71) Applicant: ZEON CORPORATION, Chiyoda-ku Tokyo (JP)

(72) Inventor: Naoki Takahashi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 340 days.

(21) Appl. No.: 16/494,849

(22) PCT Filed: Feb. 26, 2018

(86) PCT No.: PCT/JP2018/007016
§ 371 (c)(1),
(2) Date: Sep. 17, 2019

(87) PCT Pub. No.: WO2018/180101
PCT Pub. Date: Oct. 4, 2018

(65) Prior Publication Data
US 2020/0036008 A1 Jan. 30, 2020

(30) Foreign Application Priority Data
Mar. 28, 2017 (JP) .............................. JP2017-063430

(51) Int. Cl.
*H01M 4/62* (2006.01)
*C08F 212/08* (2006.01)
*C08F 236/12* (2006.01)

(52) U.S. Cl.
CPC ........... *H01M 4/622* (2013.01); *C08F 212/08* (2013.01); *C08F 236/12* (2013.01)

(58) Field of Classification Search
CPC .................................................. C08F 236/12
See application file for complete search history.

(56) References Cited

U.S. PATENT DOCUMENTS

| 5,484,844 A * | 1/1996 | Oshima .................... C08L 27/06 |
| | | 524/521 |
| 5,914,195 A * | 6/1999 | Hori ....................... C08L 23/286 |
| | | 428/520 |
| 10,280,298 B2 | 5/2019 | Nakashima et al. |
| 10,312,522 B2 * | 6/2019 | Fukumine ................. C08F 2/38 |
| 10,566,627 B2 | 2/2020 | Yamamoto |
| 10,844,181 B2 * | 11/2020 | Schmidt .................... C08J 3/075 |
| 11,021,596 B2 * | 6/2021 | Salem ....................... C08L 9/02 |
| 2013/0106029 A1 | 5/2013 | Snyder et al. |
| 2013/0330622 A1 | 12/2013 | Sasaki |
| 2015/0357648 A1 * | 12/2015 | Sugimoto .......... H01M 10/0525 |
| | | 429/217 |
| 2016/0036055 A1 | 2/2016 | Yamamoto |
| 2016/0118664 A1 | 4/2016 | Sonobe |
| 2017/0342242 A1 * | 11/2017 | Kato ..................... C08F 236/12 |
| 2019/0071530 A1 * | 3/2019 | Igari ..................... C08F 236/04 |
| 2020/0062879 A1 * | 2/2020 | Simpson ................. B29C 41/14 |

FOREIGN PATENT DOCUMENTS

| CN | 104396060 A | 3/2015 |
| CN | 105229824 A | 1/2016 |
| EP | 2953193 A1 | 12/2015 |
| JP | 2012204303 A | 10/2012 |
| JP | 2013008485 A * | 1/2013 |
| JP | 2013161689 A | 8/2013 |
| JP | 2013229327 A | 11/2013 |
| JP | 2014123550 A | 7/2014 |
| JP | 5861698 B2 | 2/2016 |
| KR | 1020150132156 A | 11/2015 |
| WO | 2012115096 A1 | 8/2012 |
| WO | 2014051067 A1 | 4/2014 |
| WO | 2014119790 A1 | 8/2014 |

OTHER PUBLICATIONS

Machine translation of WO 2014/051067 (no date).*
Machine translation of JP 2013-008485 (no date).*
Apr. 24, 2018, International Search Report issued in the International Patent Application No. PCT/JP2018/007016.
Oct. 1, 2019, International Preliminary Report on Patentability issued in the International Patent Application No. PCT/JP2018/007016.
Nov. 26, 2020, the Extended European Search Report issued by the European Patent Office in the corresponding European Patent Application No. 18776083.0.

* cited by examiner

*Primary Examiner* — Amanda C. Walke
(74) *Attorney, Agent, or Firm* — Kenja IP Law PC

(57) ABSTRACT

The present disclosure is directed to providing a binder composition for a non-aqueous secondary battery electrode which can improve the peel strengths of electrodes while increasing the pressibilities of pre-pressing electrode mixed material layers. The presently disclosed binder composition contains a polymer A, wherein the polymer A includes an aliphatic conjugated diene monomer unit and a nitrile-group containing monomer unit, and the polymer A has a THF-insoluble content of 20% by mass or less.

8 Claims, No Drawings

BINDER COMPOSITION FOR NON-AQUEOUS SECONDARY BATTERY ELECTRODE, SLURRY COMPOSITION FOR NON-AQUEOUS SECONDARY BATTERY ELECTRODE, NON-AQUEOUS SECONDARY BATTERY ELECTRODE, NON-AQUEOUS SECONDARY BATTERY, AND METHOD OF PRODUCING NON-AQUEOUS SECONDARY BATTERY ELECTRODE

TECHNICAL FIELD

The present disclosure relates to a binder composition for a non-aqueous secondary battery electrode, a slurry composition for a non-aqueous secondary battery electrode, a non-aqueous secondary battery electrode, a non-aqueous secondary battery, and a method of producing a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. Consequently, in recent years, studies have been made to improve electrodes and other battery components with the aim of achieving even higher non-aqueous secondary battery performance.

An electrode for a non-aqueous secondary battery, such as a lithium ion secondary battery, typically includes a current collector and an electrode mixed material layer formed on the current collector. The electrode mixed material layer is formed, for example, by applying, onto the current collector, a slurry composition in which an electrode active material, a binder composition containing a binding material, and so forth are dispersed in a dispersion medium, and drying the applied slurry composition.

In recent years, in order to further improve the performance of a secondary battery, a stronger adhesion of an electrode mixed material layer to a current collector (in other words, an improvement in the peel strength of an electrode) has been demanded. To address these issues, Patent Document 1 and 2 have proposed improved binder compositions to be used for preparation of electrode mixed material layers, for example.

CITATION LIST

Patent Literature

Patent Literature 1: JP 2013-229327 A
Patent Literature 2: JP 2014-123550 A

SUMMARY

Technical Problem

Against this background, aiming at providing a sufficient peel strength of an electrode and improving the energy density of a secondary battery, a technique to press an electrode mixed material layer on a current collector has been adopted. Specifically, a slurry composition is applied onto a current collector, and is then dried. The resultant pre-pressing electrode mixed material layer is pressed by a roll press or the like, to thereby yield a post-pressing electrode mixed material layer that is closely adhered to a current collector and has a high density.

Such a pre-pressing electrode mixed material layer formed by pressing a conventional binder composition as described above, however, may not have a sufficiently high density after pressed (in other words, it has low pressibility), and conventional binder compositions as described above may not provide electrodes having sufficiently high peel strengths. Accordingly, there is still room for improvement over the conventional binder compositions described above in terms of assurance of a satisfactory peel strength of an electrode and enhancement of the pressibility of a pre-pressing electrode mixed material layer.

Accordingly, the present disclosure is directed to providing a binder composition for a non-aqueous secondary battery electrode and a slurry composition for a non-aqueous secondary battery electrode which can improve the peel strengths of electrodes while increasing the pressibilities of pre-pressing electrode mixed material layers.

The present disclosure is also directed to providing a non-aqueous secondary battery electrode having an excellent peel strength and a method of producing the same, and a non-aqueous secondary battery having the non-aqueous secondary battery electrode.

Solution to Problem

The inventor conducted diligent investigation with the aim of solving the aforementioned issues. The inventor discovered that usage of a polymer, as a binder, including certain monomer units and having a THF (tetrahydrofuran) insoluble content of a certain value or less could increase the pressibilities of pre-pressing electrode mixed material layers and thus readily increased the density of the electrode mixed material layers, thereby completing the present disclosure.

Specifically, the present disclosure is directed to advantageously solving the aforementioned issues, and the binder composition for a non-aqueous secondary battery electrode comprises a polymer A, wherein the polymer A includes an aliphatic conjugated diene monomer unit and a nitrile-group containing monomer unit, and the polymer A has a THF-insoluble content of 20% by mass or less. As described above, the binder composition comprising the polymer including the aliphatic conjugated diene monomer unit and the nitrile-group containing monomer unit, and having a THF-insoluble content of 20% by mass or less can improve the peel strengths of electrodes, as well as improving the pressibilities of pre-pressing electrode mixed material layers.

Note that the "THF-insoluble content" of a polymer in the present disclosure can be measured by a method described in the EXAMPLES section of the present specification. Moreover, in the present disclosure, "including a monomer unit" means that "a repeating unit derived from that monomer is included in a polymer obtained using that monomer".

Here, in the presently disclosed binder composition for a non-aqueous secondary battery electrode, the polymer A preferably includes the nitrile-group containing monomer unit in a proportion of 10% by mass or more and 40% by mass or less. The polymer A containing the nitrile-group containing monomer unit in the aforementioned proportion can further improve the pressibilities of pre-pressing electrode mixed material layers and the peel strengths of electrodes.

Moreover, in the presently disclosed binder composition for a non-aqueous secondary battery electrode, the polymer A preferably includes the aliphatic conjugated diene monomer unit in a proportion of 20% by mass or more and 65% by mass or less. The polymer A including the aliphatic conjugated diene monomer unit in the aforementioned proportion can further improve the pressibilities of pre-pressing electrode mixed material layers and the peel strengths of electrodes.

Preferably, the presently disclosed binder composition for a non-aqueous secondary battery electrode further comprises a polymer B, and the polymer B includes an aliphatic conjugated diene monomer unit and an aromatic vinyl monomer unit. The binder composition further comprising the polymer B including the aliphatic conjugated diene monomer unit and the aromatic vinyl monomer unit can further improve the peel strengths of electrodes.

Moreover, the present disclosure is directed to advantageously solving the aforementioned issues, and a presently disclosed slurry composition for a non-aqueous secondary battery electrode comprises an electrode active material, and any of the aforementioned binder compositions for a non-aqueous secondary battery electrode. The slurry composition comprising the electrode active material and the binder compositions for a non-aqueous secondary battery electrode enables preparation of pre-pressing electrode mixed material layers having excellent pressibilities and fabrication of electrodes having excellent peel strengths.

Furthermore, the present disclosure is directed to advantageously solving the aforementioned issues, and a presently disclosed non-aqueous secondary battery electrode comprises an electrode mixed material layer formed using the aforementioned slurry composition for a non-aqueous secondary battery electrode. The aforementioned slurry composition for a non-aqueous secondary battery electrode enables provision of non-aqueous secondary battery electrodes having excellent peel strengths.

A presently disclosed non-aqueous secondary battery comprises a positive electrode, a negative electrode, an electrolyte solution, and a separator, wherein at least one of the positive electrode and the negative electrode is the non-aqueous secondary battery electrode described above. Employment of the aforementioned non-aqueous secondary battery electrode in this manner enables provision of a non-aqueous secondary battery having excellent battery characteristics.

Additionally, the present disclosure is directed to advantageously solving the aforementioned issues, and a presently disclosed method of producing a non-aqueous secondary battery electrode comprises the steps of applying the aforementioned slurry composition for a non-aqueous secondary battery electrode onto a current collector; drying the slurry composition for a non-aqueous secondary battery electrode which has been applied onto the current collector to form a pre-pressing electrode mixed material layer on the current collector; and pressing the pre-pressing electrode mixed material layer to form a post-pressing electrode mixed material layer, a temperature to press the pre-pressing electrode mixed material layer being 0° C. or higher and 45° C. or lower. Employment of the process using the foregoing slurry composition can increase the density of the electrode mixed material layer in a suitable manner, and enables production of the electrode having an excellent peel strength.

Here, the presently disclosed method of producing a non-aqueous secondary battery electrode preferably further comprises the step of heating the post-pressing electrode mixed material layer at 50° C. or higher and 200° C. or lower. The heating of the post-pressing electrode mixed material layer at a temperature within the aforementioned range can suppress a recovery (elastic recovery) of the shape from an elastic deformation which has been provided to the electrode during the pressing (this phenomenon is referred to as "spring back"), as well as further improving the peel strength of the electrode.

Advantageous Effect

In accordance with the present disclosure, a binder composition for a non-aqueous secondary battery electrode and a slurry composition for a non-aqueous secondary battery electrode can be provided which can improve the peel strengths of electrodes while increasing the pressibilities of pre-pressing electrode mixed material layers.

In addition, in accordance with the present disclosure, a non-aqueous secondary battery electrode having an excellent peel strength and a method of producing the same, and a non-aqueous secondary battery having the non-aqueous secondary battery electrode, can also be provided.

DETAILED DESCRIPTION

Embodiments of the present disclosure will be described in detail below.

A presently disclosed binder composition for a non-aqueous secondary battery electrode can be used for preparation of a presently disclosed slurry composition for a non-aqueous secondary battery electrode. Moreover, the presently disclosed slurry composition for a non-aqueous secondary battery electrode prepared using the presently disclosed binder composition for a non-aqueous secondary battery electrode can be used to form a presently disclosed non-aqueous secondary battery electrode by a presently disclosed method of forming a non-aqueous secondary battery electrode. Furthermore, a presently disclosed non-aqueous secondary battery comprises the presently disclosed non-aqueous secondary battery electrode formed using the presently disclosed slurry composition for a non-aqueous secondary battery electrode.

(Binder Composition for Non-Aqueous Secondary Battery Electrode)

The presently disclosed binder composition for a non-aqueous secondary battery electrode contains a polymer A as a binder, and may optionally further contain a polymer B as a binder and an additional component that can be included in secondary battery electrodes. The presently disclosed binder composition for a non-aqueous secondary battery electrode typically further contains a dispersion medium such as water. In the presently disclosed binder composition for a non-aqueous secondary battery electrode, the polymer A includes an aliphatic conjugated diene monomer unit and a nitrile-group containing monomer unit, and a THF-insoluble content of the polymer A is 20% by mass or less.

Since the presently disclosed binder composition contains the polymer A including the aliphatic conjugated diene monomer unit and the nitrile-group containing monomer unit, and having a THF-insoluble content of 20% by mass or less as described above, the pressibilities of pre-pressing electrode mixed material layers are increased, which contributes to readily increase the density of the electrode mixed material layers, and excellent peel strengths can be provided to electrodes.

<Polymer A>

In an electrode produced by forming an electrode mixed material layer on a current collector using a slurry composition for a non-aqueous secondary battery electrode prepared from the binder composition, the polymer A holds components contained in the electrode mixed material layer to prevent these components detaching from the electrode mixed material layer (i.e., the polymer A functions as a binder).

<<THF-Insoluble Content>>

The THF-insoluble content of the polymer A needs to be 20% by mass or less, and is preferably 14% by mass or less, more preferably 10% by mass or less, even more preferably 8% by mass or less, and still even more preferably 5% by mass or less. The polymer A having a THF-insoluble content of 20% by mass or less readily deforms responsive to a pre-pressing electrode mixed material layer being pressed, and does not hinder displacement of the electrode active material or the like. The reason is assumed that such a polymer A has flexibility and thus is capable of functioning as a cushioning material. Hence, the binder composition containing the polymer A enables favorable fabrication of an electrode provided with a highly densified electrode mixed material layer. The lower limit of the THF-insoluble content of the polymer A is 0% by mass or more, and the THF-insoluble content is preferably 0.01% by mass or more, from the perspective of reducing excessive elution of the polymer A into an electrolyte solution, thereby assuring good battery characteristics of a secondary battery.

The THF-insoluble content of the polymer A can be controlled by adjusting the type and the amount of the monomers used to prepare the polymer A, the amount of a molecular weight modifier, the polymerization condition, such as the reaction temperature and the reaction time, and the like.

<<Composition>>

The polymer A includes an aliphatic conjugated diene monomer unit and a nitrile-group containing monomer unit as repeating units, and may optionally include a monomer unit other than the aliphatic conjugated diene monomer unit and the nitrile-group containing monomer unit (additional monomer unit). The polymer A including both the aliphatic conjugated diene monomer unit and the nitrile-group containing monomer unit has excellent adhesiveness and flexibility, and may contribute to an improvement in the pressibilities of pre-pressing electrode mixed material layers and the peel strength of electrodes.

[Aliphatic Conjugated Diene Monomer Unit]

Examples of aliphatic conjugated diene monomers that can be used to form the aliphatic conjugated diene monomer unit include, but are not specifically limited to, 1,3-butadiene, 2-methyl-1,3-butadiene (isoprene), and 2,3-dimethyl-1,3-butadiene. Of these aliphatic conjugated diene monomers, 1,3-butadiene and isoprene are preferable, and 1,3-butadiene is more preferable. One type of aliphatic conjugated diene monomer may be used individually, or two or more types of aliphatic conjugated diene monomers may be used in combination in an arbitrarily selected ratio.

The proportion of the aliphatic conjugated diene monomer unit in the polymer A when the amount of all monomer units in the polymer A is taken to be 100% by mass is preferably 20% by mass or more, more preferably 30% by mass or more, even more preferably 35% by mass or more, and still even more preferably 39% by mass or more, and is preferably 65% by mass or less, preferably 55% by mass or less, and preferably 50% by mass or less. The polymer A having a percentage content of the aliphatic conjugated diene monomer unit of 20% by mass or more does not have an excessively high glass-transition temperature, which ensures the adhesiveness of the polymer A and can further improve the peel strengths of electrodes. On the other hand, the polymer A having a percentage content of the aliphatic conjugated diene monomer unit of 65% by mass or less prevents an increase in the THF-insoluble content of the polymer A and can further improve the pressibilities of pre-pressing electrode mixed material layers. In addition, adhesiveness of the polymer A is ensured and the peel strengths of electrodes can be further improved, which is assumed to be achieved through the prevention of an excessive decline in the glass-transition temperature.

[Nitrile-Group Containing Monomer Unit]

Examples of nitrile group-containing monomers that can be used to form the nitrile-group containing monomer unit include α,β-ethylenically unsaturated nitrile monomers. Specifically, any α,β-ethylenically unsaturated compound that has a nitrile group may be used as the α,β-ethylenically unsaturated nitrile monomer without any specific limitations and examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these, acrylonitrile and methacrylonitrile are preferable, and acrylonitrile is more preferable as a nitrile group-containing monomer. Note that it is possible to use only one type of monomer containing a nitrile group or to use two or more types in combination at any ratio.

The proportion of the nitrile-group containing monomer unit in the polymer A when all repeating units in the polymer A are taken to be 100% by mass is preferably 10% by mass or more, more preferably 15% by mass or more, and even more preferably 20% by mass or more, and is preferably 40% by mass or less, more preferably 35% by mass or less, and even more preferably 30% by mass or less. The polymer A having a percentage content of the nitrile-group containing monomer unit of 10% by mass or more prevents an increase in the THF-insoluble content of the polymer A and can further improve the pressibilities of pre-pressing electrode mixed material layers. In addition, the adhesiveness of the polymer A is ensured and the peel strengths of electrodes can be further improved, which is assumed to be achieved through the prevention of an excessive decline in the glass-transition temperature. On the other hand, the polymer A having a percentage content of the nitrile-group containing monomer unit of 40% by mass or less does not have an excessively high glass-transition temperature, which ensures the adhesiveness of the polymer A and can further improve the peel strengths of electrodes.

[Additional Monomer Unit]

Examples of monomer units other than the above-described aliphatic conjugated diene monomer unit and the nitrile-group containing monomer unit that may be included in the polymer A include, but are not specifically limited to, repeating units derived from known monomers that are copolymerizable with aliphatic conjugated diene monomers and nitrile-group containing monomers described above. Specific examples of an additional monomer unit include, but are not specifically limited to, an aromatic vinyl monomer unit, a (meth)acrylic acid ester monomer unit, and a hydrophilic group-containing monomer unit.

One of these monomers may be used individually, or two or more of these monomers may be used in combination. In the present disclosure, "(meth)acryl" is used to indicate "acryl" and/or "methacryl".

Examples of aromatic vinyl monomers that can be used to form the aromatic vinyl monomer unit include styrene, styrenesulfonic acid and salts thereof, α-methylstyrene, butoxystyrene, and vinylnaphthalene.

Examples of (meth)acrylic acid ester monomers that can be used to form the (meth)acrylic acid ester monomer unit include alkyl esters of acrylic acid such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl esters of methacrylic acid such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

Examples of hydrophilic group-containing monomers that can be used to form the hydrophilic group-containing monomer unit include polymerizable monomers having a hydrophilic group. Examples of hydrophilic group-containing monomers include carboxy group-containing monomers, sulfonate group-containing monomers, phosphate group-containing monomers, and hydroxy group-containing monomers.

Examples of carboxy group-containing monomers include monocarboxylic acids, derivatives of monocarboxylic acids, dicarboxylic acids, acid anhydrides of dicarboxylic acids, and derivatives of dicarboxylic acids.

Examples of monocarboxylic acids include acrylic acid, methacrylic acid, and crotonic acid.

Examples of monocarboxylic acid derivatives include 2-ethylacrylic acid, isocrotonic acid, α-acetoxy acrylic acid, β-trans-aryloxy acrylic acid, α-chloro-β-E-methoxy acrylic acid, and β-diamino acrylic acid.

Examples of dicarboxylic acids include maleic acid, fumaric acid, and itaconic acid.

Examples of dicarboxylic acid derivatives include methylmaleic acid, dimethylmaleic acid, phenylmaleic acid, chloromaleic acid, dichloromaleic acid, fluoromaleic acid, and maleic acid esters such as methylallyl maleate, diphenyl maleate, nonyl maleate, decyl maleate, dodecyl maleate, octadecyl maleate, and fluoroalkyl maleates.

Examples of acid anhydrides of the dicarboxylic acid include maleic anhydride, acrylic anhydride, methylmaleic anhydride, dimethylmaleic anhydride, and the like.

Furthermore, an acid anhydride that produces a carboxyl group upon hydrolysis can also be used as a monomer having a carboxy group.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfonate group-containing monomers include vinyl sulfonic acid, methyl vinyl sulfonic acid, (meth)allyl sulfonic acid, (meth)acrylic acid-2-ethyl sulfonate, 2-acrylamido-2-methylpropane sulfonic acid, and 3-allyloxy-2-hydroxypropane sulfonic acid.

The term "(meth)allyl" as used herein means allyl and/or methallyl.

Examples of monomers having a phosphate group include 2-(meth)acryloyloxyethyl phosphate, methyl-2-(meth)acryloyloxyethyl phosphate, and ethyl-(meth)acryloyloxyethyl phosphate.

The term "(meth)acryloyl" as used in the present disclosure refers to "acryloyl and/or methacryloyl".

Examples of hydroxy group-containing monomers include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^1\text{-}COO\text{-}(C_qH_{2q}O)_p\text{-}H$ (where p represents an integer of 2 to 9, q represents an integer of 2 to 4, and $R^1$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

The percentage content of an additional monomer unit in the polymer A is preferably 0% by mass or more and 40% by mass or less, more preferably 37% by mass or less, and even more preferably 35% by mass or less.

<Preparation of Polymer A>

No specific limitations are placed on the method for preparing the polymer A. The polymer A can be prepared, for example, through polymerization, in an aqueous solvent, of a monomer composition that contains the monomers set forth above. The percentage content of each monomer in the monomer composition is typically the same as the proportion of each monomer unit in the target polymer.

The aqueous solvent is not specifically limited so long as the polymer A can be dispersed therein, and may be water used alone or a mixed solvent of water and another solvent.

The mode of polymerization is not specifically limited and may, for example, be any of solution polymerization, suspension polymerization, bulk polymerization, and emulsion polymerization. As the polymerization method, for example any of ion polymerization, radical polymerization, and living radical polymerization may be used.

A molecular weight modifier, an emulsifier, a polymerization initiator, or the like, used in polymerization can be, but are not specifically limited to, those described in JP 5861698 B, for example.

In particular, the molecular weight modifier used for preparation of the polymer A is preferably t-dodecyl mercaptan or α-methyl styrene dimer, and more preferably t-dodecyl mercaptan. The amount of molecular weight modifier used is preferably 0.01 parts by mass or more, more preferably 0.02 parts by mass or more, and even more preferably 0.05 parts by mass or more, and is preferably 1.2 parts by mass or less, more preferably 1.0 parts by mass or less, and even more preferably 0.8 parts by mass or less, when the total amount of all monomers in the monomer composition used for preparing the polymer A is taken to be 100 parts by mass. Here, when an aliphatic conjugated diene monomer is used for preparation of the polymer, the aliphatic conjugated diene monomer tends to promote formation of crosslink structures upon polymerization, which may cause the molecular weight to become too high. Such formation of crosslink structures and augmented molecular weight, in turn, increase the THF-insoluble content. However, as long as the amount of a molecular weight modifier is controlled to be in the aforementioned range when preparing the polymer A, an increase in the molecular weight of the polymer A and formations of crosslinks are controlled, which prevents an excessive increase in the THF-insoluble content of the polymer A.

Although no specific limitations are placed on the conditions for preparing the polymer A, the polymerization reaction is preferably carried out at a relatively low temperature for long time. Specifically, the reaction temperature is preferably 0° C. or higher, and more preferably 3° C. or higher, and is preferably 30° C. or lower, more preferably 25° C. or lower, and even more preferably 20° C. or lower. The reaction time is preferably 8 hours or longer, and more preferably 12 hours or longer, and is preferably 30 hours or shorter, and more preferably 28 hours or shorter. By adjusting the reaction temperature and the reaction time as described above, a suitable reaction efficiency is ensured, and an increases in the molecular weight of the polymer A and formations of crosslinks are restricted, which prevents an excessive increase in the THF-insoluble content of the polymer A.

<Polymer B>

The presently disclosed binder composition preferably further contains a polymer B including an aliphatic conjugated diene monomer unit and an aromatic vinyl monomer unit. In an electrode produced by forming an electrode mixed material layer on a current collector using a slurry composition for a non-aqueous secondary battery electrode prepared from the binder composition, the polymer B holds components contained in the electrode mixed material layer to prevent these components detaching from the electrode mixed material layer (i.e., the polymer B functions as a binder in conjunction with the previously described polymer A).

The binder composition further containing a polymer B including the aliphatic conjugated diene monomer unit and the aromatic vinyl monomer unit can further improve the peel strengths of electrodes.

<<THF Insoluble Amount>>

The tetrahydrofuran (THF) insoluble amount of the polymer B is preferably more than 20% by mass, more preferably 60% by mass or more, even more preferably 80% by mass or more, still even more preferably 82% by mass or more, and yet still even more preferably 85% by mass or more, and is preferably 99% by mass or less and more preferably 98% by mass or less. The polymer B of the THF-insoluble content of more than 20% by mass ensures the breaking strength of the polymer B, which further improves the peel strengths of electrodes. On the other hand, the polymer B of the THF-insoluble content of 99% by mass or less promotes blending of the polymer B and an electrolyte solution and ensures the injectability of the electrolyte solution upon production of a secondary battery, thereby improving the battery characteristics of the secondary battery.

The THF-insoluble content of the polymer B can be controlled by adjusting the type and the amount of the monomers used to prepare the polymer B, the amount of a molecular weight modifier, the polymerization condition, such as the reaction temperature and the reaction time, and the like.

<<Composition>>

The polymer B includes an aliphatic conjugated diene monomer unit and an aromatic vinyl monomer unit as repeating units, and may optionally include a monomer unit other than the aliphatic conjugated diene monomer unit and the aromatic vinyl monomer unit (additional monomer unit).

[Aliphatic Conjugated Diene Monomer Unit]

Examples of aliphatic conjugated diene monomers that can be used to form the aliphatic conjugated diene monomer unit of the polymer B include the same aliphatic conjugated diene monomers as those that can be used to form the aliphatic conjugated diene monomer unit of the previously described polymer A. Of these monomers, 1,3-butadiene and isoprene are preferable, and 1,3-butadiene is more preferable as the aliphatic conjugated diene monomer forming the aliphatic conjugated diene monomer unit of the polymer B. One type of aliphatic conjugated diene monomer may be used individually, or two or more types of aliphatic conjugated diene monomers may be used in combination in an arbitrarily selected ratio.

The proportion of the aliphatic conjugated diene monomer unit in the polymer B when all repeating units in the polymer B are taken to be 100% by mass is preferably 20% by mass or more, more preferably 25% by mass or more, and even more preferably 30% by mass or more, and is preferably 50% by mass or less, more preferably 45% by mass or less, and even more preferably 40% by mass or less. The polymer B having a percentage content of the aliphatic conjugated diene monomer unit of 20% by mass or more does not have an excessively high glass-transition temperature, which ensures the adhesiveness of the polymer B and can further improve the peel strengths of electrodes. On the other hand, a percentage content of the aliphatic conjugated diene monomer unit of 50% by mass or less ensures the breaking strength of the polymer B, which further improves the peel strengths of electrodes.

[Aromatic Vinyl Monomer Unit]

Examples of aromatic vinyl monomers that can be used to form the aromatic vinyl monomer unit of the polymer B include the same aromatic vinyl monomers as those that can be used to form other monomer units of the previously described polymer A. Of these, styrene is preferred as the aromatic vinyl monomer forming the aromatic vinyl monomer unit of the polymer B. The aromatic vinyl monomer may be used alone or in combination of two or more thereof at any ratio.

The proportion of the aromatic vinyl monomer unit in the polymer B when all repeating units in the polymer B are taken to be 100% by mass is preferably 40% by mass or more, more preferably 50% by mass or more, and even more preferably 55% by mass or more, and is preferably 80% by mass or less, more preferably 75% by mass or less, and even more preferably 70% by mass or less. The percentage content of the aromatic vinyl monomer unit of 40% by mass or more ensures the breaking strength of the polymer B, which further improves the peel strengths of electrodes. On the other hand, the polymer B with the percentage content of the aromatic vinyl monomer unit of 80% by mass or less does not have an excessively high glass-transition temperature, which ensures the adhesiveness of the polymer B and can further improve the peel strengths of electrodes.

[Additional Monomer Unit]

Examples of monomer units other than the above-described aliphatic conjugated diene monomer unit and aromatic vinyl monomer unit that may be included in the polymer B include, but are not specifically limited to, repeating units derived from known monomers that are copolymerizable with aliphatic conjugated diene monomers and aromatic vinyl monomers described above. Specific examples of an additional monomer unit include, but are not specifically limited to, a (meth)acrylic acid ester monomer unit and a hydrophilic group-containing monomer unit.

One of these monomers may be used individually, or two or more of these monomers may be used in combination.

Examples of (meth)acrylic acid ester monomers and hydrophilic group-containing monomers that can be used to form a (meth)acrylic acid ester monomer unit and a hydrophilic group-containing monomer unit of the polymer B include the same (meth)acrylic acid ester monomers and hydrophilic group-containing monomers as those that can be used to form an additional monomer unit in the previously described polymer A. Of these monomers, methyl methacrylate and 2-ethylhexyl acrylate are preferable as (meth)acrylic acid ester monomers for forming a (meth)acrylic acid ester monomer unit of the polymer B. Moreover, carboxy group-containing monomers and hydroxy group-containing monomers are preferable, and itaconic acid and 2-hydroxyethyl acrylate are more preferable as hydrophilic group-containing monomers for forming a hydrophilic group-containing monomer unit.

The percentage content of the additional monomer unit in the polymer B is preferably 0% by mass or more and 30% by mass or less, more preferably 20% by mass or less, and even more preferably 10% by mass or less.

The polymer B can be prepared, but is not specifically limited to, through polymerization of a monomer composition that contains the monomers described above. The proportion of each monomer in the monomer composition is typically the same as the proportion of each monomer unit in the target polymer. No specific limitations are placed on the mode of polymerization of the polymer B. For example, any of solution polymerization, suspension polymerization, bulk polymerization, and emulsion polymerization may be used. Moreover, the polymerization reaction may be addition polymerization such as ionic polymerization, radical polymerization, or living radical polymerization. A molecular weight modifier, an emulsifier, a polymerization initiator, or the like, used in polymerization may be the ones that are generally used and the amount thereof may also be the one that are generally used.

<Content Ratio of Polymer A to Polymer B>

When the presently disclosed binder composition contains the polymer B, no specific limitations are placed on the content ratio of the polymer A to the polymer B. Yet, the content of the polymer B in the binder composition is preferably 20% by mass or more, more preferably 25% by mass or more, and even more preferably 40% by mass or more, and preferably 80% by mass or less and more preferably 75% by mass or less, of the total content of the polymer A and the polymer B. The content of the polymer B in the binder composition of 20% by mass or more of the total content of the polymer A and the polymer B can further enhance the peel strengths of electrodes, and that of 80% by mass or less can ensure satisfactory pressibility of a pre-pressing electrode mixed material layers.

Note that the presently disclosed binder composition for a non-aqueous secondary battery electrode may further contain any polymer other than the polymer A and the polymer B described above as a binder.

<Dispersion Medium>

The dispersion medium contained in the presently disclosed binder composition is not specifically limited and may, for example, be water.

Alternatively, the dispersion medium may be an aqueous solution of any compound or a mixed solution of water and a small amount of an organic solvent.

<Other Components>

Other than the components set forth above, the presently disclosed binder composition may contain components such as a reinforcing material, a leveling agent, a viscosity modifier, and an additive for electrolyte solution. These optional components are not limited so long as they do not affect the battery reaction, and may be selected from well-known components, such as those described in WO2012/115096. One of these components may be used individually, or two or more of these components may be used in combination in an arbitrarily selected ratio.

<Method of Preparing Binder Composition>

No specific limitations are placed on the method for preparing the presently disclosed binder composition. Upon preparing a binder composition only containing the polymer A as a binder, for example, an aqueous solution containing the polymer A after a polymerization reaction may be used, as produced, as the binder composition, or an additional component may be mixed with a water dispersion containing the polymer A. Alternatively, upon preparing a binder composition containing the polymer A and the polymer B as binders, for example, a water dispersion containing the polymer A, a water dispersion containing the polymer B and an optional component may be mixed together. Note that in a situation in which a water dispersion of a polymer is used for preparing the binder composition, liquid content of this water dispersion may be used as the dispersion medium of the binder composition.

(Slurry Composition for Non-Aqueous Secondary Battery Electrode)

A presently disclosed slurry composition for a non-aqueous secondary battery electrode includes an electrode active material and the binder composition described above, and optionally contains other components. In other words, the presently disclosed slurry composition for a non-aqueous secondary battery electrode typically contains an electrode active material, the above-described the polymer A, and a dispersion medium, and optionally contains the polymer B and an additional component. The slurry composition, as a result of containing the binder composition set forth above, enables preparation of pre-pressing electrode mixed material layers having excellent pressibilities and fabrication of electrodes having excellent peel strengths.

Although the following describes, as one example, a case in which the slurry composition for a non-aqueous secondary battery electrode is a slurry composition for lithium ion secondary battery negative electrodes, the present disclosure is not limited to the following example.

<Electrode Active Material>

The electrode active material is a material that accepts and donates electrons in an electrode of a secondary battery. The negative electrode active material of a lithium ion secondary battery is typically a material that can occlude and release lithium.

Specific examples of negative electrode active materials for lithium ion secondary batteries include carbon-based negative electrode active materials, metal-based negative electrode active materials, and negative electrode active materials formed by combining these materials.

A carbon-based negative electrode active material refers to an active material that has carbon as the main skeleton and that can have lithium intercalated (doped) therein. Examples of the carbon-based negative electrode active material include a carbonaceous material and a graphitic material.

Examples of carbonaceous materials include graphitizing carbon and non-graphitizing carbon, typified by glassy carbon, which has a structure similar to an amorphous structure.

Here, the graphitizing carbon may be a carbon material made from tar pitch that can be obtained from petroleum or coal. Specific examples include coke, mesocarbon microbead (MCMB), mesophase pitch-based carbon fiber, pyrolytic vapor-grown carbon fiber, and the like.

Examples of the non-graphitizing carbon include a phenolic resin burned substance, polyacrylonitrile-based carbon fiber, quasi-isotropic carbon, furfuryl alcohol resin burned substance (PFA), hard carbon, and the like.

Examples of graphitic materials include natural graphite and artificial graphite.

Examples of artificial graphite include artificial graphite resulting from heat treatment, mainly at 2,800° C. or higher, of carbon that contains graphitizing carbon; graphitized MCMB resulting from heat treatment, at 2,000° C. or higher, of MCMB; graphitized mesophase pitch-based carbon fiber resulting from heat treatment, at 2,000° C. or higher, of mesophase pitch-based carbon fiber; and the like.

The metal-based negative electrode active material is an active material that contains metal, the structure of which usually contains an element that allows intercalation of lithium, and that exhibits a theoretical electric capacitance of 500 mAh/g or higher per unit mass when lithium is intercalated. For the metal-based active material, for example, lithium metal, an elementary metal that can be used to form lithium alloys (for example, Ag, Al, Ba, Bi, Cu, Ga, Ge, In, Ni, P, Pb, Sb, Si, Sn, Sr, Zn, Ti, and the like) and alloys thereof; and oxides, sulfides, nitrides, silicides, carbides, and phosphides thereof can be used. Of these metal-based negative electrode active materials, active materials containing silicon (silicon-based negative electrode active materials) are preferred. The use of a silicon-based negative electrode active material results in the increased capacity of lithium ion secondary batteries.

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon. One type of silicon-based negative electrode active material may be used individually, or two or more types of silicon-based negative electrode active materials may be used in combination.

<Binder Composition>

As a binder composition, the presently disclosed binder composition for a non-aqueous secondary battery electrode may be used, which comprises the polymer A as a binder and optically comprises the polymer B.

The content in the slurry composition of the polymer A derived from the binder composition, in terms of solid content per 100 parts by mass of the electrode active material, is preferably 0.1 parts by mass or more and more preferably 0.2 parts by mass or more, and preferably 5 parts by mass or less and more preferably 3 parts by mass or less. In addition, the content in the slurry composition of the polymer B derived from the binder composition, in terms of solid content per 100 parts by mass of the electrode active material, is preferably 0.1 parts by mass or more and more preferably 0.2 parts by mass or more, and preferably 5 parts by mass or less and more preferably 3 parts by mass or less.

<Additional Component>

Examples of an additional component that may be contained in the slurry composition include, but are not specifically limited to, the same additional components that may be contained in the presently disclosed binder composition. The slurry composition may further contain a conductive material such as carbon black. One of such other components may be used individually, or two or more of such other components may be used in combination in an arbitrarily selected ratio.

<Preparation of Slurry Composition>

The slurry composition described above can be prepared by dispersing or dissolving the above-mentioned components in a dispersion medium such as water. Specifically, the slurry composition can be prepared by mixing the above-described components and the dispersion medium using a mixer such as a ball mill, a sand mill, a bead mill, a pigment disperser, a grinding machine, an ultrasonic disperser, a homogenizer, a planetary mixer, or a FILMIX. Mixing of the aforementioned components and the dispersion medium can typically be performed for a period of 10 minutes to several hours in a temperature range of room temperature to 70° C. The dispersion medium used in the production of the slurry composition may be the same as that of the binder composition. Moreover, the dispersion medium used in preparation of the slurry composition may include the dispersion medium that was contained in the binder composition.

(Non-Aqueous Secondary Battery Electrode)

A presently disclosed non-aqueous secondary battery electrode comprises an electrode mixed material layer formed using the slurry composition for a non-aqueous secondary battery electrode set forth above, and typically comprises a current collector having the electrode mixed material layer formed thereon. The electrode mixed material layer contains at least an electrode active material and the polymer A, and optionally contains the polymer B and an additional component. The polymer A and the polymer B may be crosslinked by residual double bonds in the aliphatic conjugated diene monomer unit in a heating step, which will be described below. In other words, electrode mixed material layer may contain cross-linked product of the polymer A and/or the polymer B.

Since the presently disclosed non-aqueous secondary battery electrode is formed using the presently disclosed slurry composition comprising the presently disclosed binder composition, it has an excellent peel strength.

(Production Method of Non-Aqueous Secondary Battery Electrode)

The presently disclosed non-aqueous secondary battery electrode can be produced, for example, by a presently disclosed method of producing a non-aqueous secondary battery electrode.

The presently disclosed method of producing a non-aqueous secondary battery electrode comprises a step of applying the presently disclosed slurry composition described above onto a current collector (application step), a step of drying the slurry composition applied onto the current collector to form a pre-pressing electrode mixed material layer (drying step), a step of pressing the pre-pressing electrode mixed material layer to form a post-pressing electrode mixed material layer (pressing step), wherein the temperature (pressing temperature) for pressing the pre-pressing electrode mixed material layer in the pressing step is 0° C. or higher and 45° C. or lower. The presently disclosed method of producing a non-aqueous secondary battery electrode preferably comprises a step of heating the post-pressing electrode mixed material layer at 50° C. or higher and 200° C. or lower after the pressing step (heating step).

<Application Step>

The method of applying the aforementioned slurry composition on a current collector is not particularly limited, and any of the methods known in the art may be used. Specifically, the slurry composition may be applied for example by doctor blading, dip coating, reverse roll coating, direct roll coating, gravure coating, extrusion coating, or brush coating. The slurry composition may be applied onto one side or both sides of the current collector. The thickness of the slurry coating on the current collector after application but before drying may be set as appropriate in accordance with the thickness of the electrode mixed material layer to be obtained after drying.

The current collector to be coated with the slurry composition is made of a material having electrical conductivity and electrochemical durability. Specifically, a current collector formed from iron, copper, aluminum, nickel, stainless steel, titanium, tantalum, gold, platinum, or the like, for example, may be used as the current collector. The aforementioned materials may be used alone or in combination of two or more thereof at any ratio.

<Drying Step>

The slurry composition that has been applied onto the current collector may be dried by any commonly known method without any specific limitations. □ Examples of drying methods that can be used include drying by warm, hot, or low-humidity air; drying in a vacuum; and drying by irradiation with infrared light, electron beams, or the like. Through drying of the slurry composition on the current collector as described above, a pre-pressing electrode mixed material layer can be formed on the current collector. The drying temperature preferably is, but not specifically limited to, 30° C. or higher and 300° C. or lower. A drying temperature of 30° C. or higher can ensure a satisfactory efficiency of the drying. On the other hand, a drying temperature of 300° C. or lower inhibits crosslinking reactions of the polymer A and an optional polymer B induced by the drying, which ensures a satisfactory pressibility of a pre-pressing electrode mixed material layer in the subsequent pressing step.

<Pressing Step>

The method for pressing the pre-pressing electrode mixed material layer on the current collector is not specifically limited and may for example be a commonly known method, such as die press and roll press, for example. The pressing temperature is 0° C. or higher and 45° C. or lower, is preferably 10° C. or higher and preferably 30° C. or lower. If the pressing temperature is less than 0° C., the polymer A in the pre-pressing electrode mixed material layer might not be softened sufficiently, hindering formation of a post-pressing electrode mixed material layer that has sufficiently high density and is closely adhered to the current collector. In addition, the pressing temperature of higher than 45° C. is undesirable because the pre-pressing electrode mixed material layer might be transferred to the pressing apparatus, which significantly reduces the productivity.

<Heating Step>

The post-pressing electrode mixed material layer on the current collector obtained in the above-described pressing step is preferably heated to promote crosslinking reactions of the polymer A and an optional polymer B in the post-pressing electrode mixed material layer. Specifically, residual double bonds in aliphatic conjugated diene monomer units included in the polymer A and/or the polymer B are preferably crosslinked by means of heating, thereby promoting crosslinking reactions of the polymer. The heating step after the pressing step further improves the peel strength of the electrode, as well as suppressing the spring back of the electrode.

The method for heating the post-pressing electrode mixed material layer on the current collector is not specifically limited and a well-known heating method can be used. The heating temperature is preferably 50° C. or higher, more preferably 70° C. or higher, and even more preferably 85° C. or higher, and preferably 200° C. or lower, more preferably 160° C. or lower, and even more preferably 150° C. or lower, from the perspectives of enhancing both the effect to improve the peel strength and the effect to suppress a spring back by promoting crosslinking reactions to sufficient and suitable extent.

Furthermore, the heating time is preferably 1 hour or longer, more preferably 2 hours or longer, and even more preferably 3 hours or longer, and preferably 24 hours or shorter, more preferably 20 hours or shorter, and even more preferably 15 hours or shorter, from the perspectives of enhancing both the effect to improve the peel strength and the effect to suppress a spring back as described above by promoting crosslinking reactions to sufficient and suitable extent.

(Non-Aqueous Secondary Battery)

A presently-disclosed non-aqueous secondary battery includes a positive electrode, a negative electrode, an electrolyte solution, and a separator, wherein the presently disclosed non-aqueous secondary battery electrode is used as at least one of the positive electrode and the negative electrode. The presently-disclosed non-aqueous secondary battery has excellent battery characteristics as a result of including the presently disclosed non-aqueous secondary battery electrode.

The presently disclosed secondary battery is preferably a secondary battery in which the presently disclosed secondary battery electrode is used as a negative electrode. Although the following describes, as one example, a case in which the secondary battery is a lithium ion secondary battery, the present disclosure is not limited to the following example.

<Electrode>

As explained above, the presently disclosed non-aqueous secondary battery electrode is used as at least one of the positive electrode and the negative electrode. In other words, the positive electrode of the lithium ion secondary battery may be the presently disclosed electrode and the negative electrode of the lithium ion secondary battery may be a known negative electrode other than the presently disclosed electrode. Alternatively, the negative electrode of the lithium ion secondary battery may be the presently disclosed electrode and the positive electrode of the lithium ion secondary battery may be a known positive electrode other than the presently disclosed electrode. Further alternatively, the positive electrode and the negative electrode of the lithium ion secondary battery may both be the presently disclosed electrodes.

Note that when a known electrode other than the presently disclosed non-aqueous secondary battery electrode is used, this electrode may be an electrode that is obtained by forming an electrode mixed material layer on a current collector by a known production method.

<Electrolyte Solution>

The electrolyte solution is typically an organic electrolyte solution obtained by dissolving a supporting electrolyte in an organic solvent. The supporting electrolyte of a lithium ion secondary battery may, for example, be a lithium salt. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferred in that they easily dissolve in solvent and exhibit a high degree of dissociation, with $LiPF_6$ being particularly preferred. One kind of electrolyte may be used alone, or two or more kinds may be used in combination at any ratio. In general, the lithium ion conductivity tends to increase when a supporting electrolyte having a high degree of dissociation is used. Therefore, the lithium ion conductivity can be adjusted through the type of supporting electrolyte that is used.

The organic solvent used in the electrolyte solution is not specifically limited so long as the supporting electrolyte can dissolve therein. Examples of suitable organic solvents that can be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as y-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferred for their high dielectric constant and broad stable potential region.

The concentration of the electrolyte in the electrolyte solution can be adjusted as needed. For example, the concentration is preferably 0.5% to 15% by mass, more preferably 2% to 13% by mass, and even more preferably 5% to 10% by mass. Known additives such as vinylene carbonate, fluoroethylene carbonate, and ethyl methyl sulfone may be added to the electrolyte solution.

<Separator>

Examples of separators that can be used include, but are not specifically limited to, those described in JP 2012-204303 A. Of these separators, a fine porous membrane made of polyolefinic (i.e., polyethylene, polypropylene, polybutene, and polyvinyl chloride) resin is preferred, because such a membrane can reduce the total thickness of the separator, which increases the ratio of the electrode active material in the secondary battery, consequently increasing the capacity per volume.

<Production Method of Secondary Battery>

The secondary battery of the present disclosure is produced, for example, by stacking a positive electrode and a negative electrode with a separator provided therebetween, for example rolling or folding the resulting electrodes as necessary in accordance with the battery shape to place them in a battery container, filling the battery container with an electrolyte solution, and sealing the container. In order to prevent pressure increase inside the secondary battery and occurrence of overcharging or overdischarging, an overcurrent preventing device such as a fuse or a PTC device; an expanded metal; or a lead plate may be provided as necessary. The secondary battery may take any shape such as a coin, a button, a sheet, a cylinder, a square, and a plane.

EXAMPLES

The following provides a more specific description of the present disclosure based on examples. However, the present disclosure is not limited to the following examples. In the following description, "%" and "parts" used in expressing quantities are by mass, unless otherwise specified.

The THF-insoluble content of a polymer, the pressibility of an pre-pressing negative electrode mixed material layer, an extent of suppression of a spring back of a negative electrode, and the peel strengths of the negative electrode (after a pressing step and after a heating step) in each of Examples and Comparative Examples were measured and evaluated in the following procedures.

<THF Insoluble Content>

A water dispersion of a resultant polymer was dried in an environment of 50% humidity and 23° C. to 25° C. to prepare a film having a thickness of 1±0.3 mm. The produced film was cut into 5-mm squares to prepare film pieces, and these film pieces was precisely weighed out such that they weighed in total as close to 1 g as possible. The weight of the precisely weighed film pieces was recorded as W0. The precisely weighed film pieces were then placed into a #80 mesh SUS mesh cage (weight: W1) that was also precisely weighed. The mesh cage having the film pieces contained therein was immersed in 100 g of tetrahydrofuran (THF) for 24 hours at 25° C. Thereafter, the mesh cage was taken out from THF, vacuum dried at 105° C. for 3 hours, and its weight (sum of the mass of the insoluble content and the mass of the mesh cage) W2 was measured. The THF insoluble component was calculated according to the following equation, and the first figure of decimal position of the result was rounded off.

THF insoluble content $(\%) = (W2-W1)/W0 \times 100$

<Pressibility>

A negative electrode web prior to being subjected to a pressing step was cut into a piece of 100 mm in length and 100 mm in width to prepare a test piece. This test piece was pressed at 12 MPa for 30 seconds, and the density of the post-pressing negative electrode mixed material layer was calculated and evaluated according to the following criteria. A smaller density of the post-pressing negative electrode mixed material layer indicated that the pre-pressing negative electrode mixed material layer had better pressibility. For evaluations in Example and Comparative Example, the "density" of a negative electrode mixed material layer was calculated from the mass and thickness per unit area of the negative electrode mixed material layer.

A: The density of the post-pressing negative electrode mixed material layer was 1.60 g/cm³ or greater B: The density of the post-pressing negative electrode mixed material layer was 1.57 g/cm³ or greater and less than 1.60 g/cm³

C: The density of the post-pressing negative electrode mixed material layer was 1.54 g/cm³ or greater and less than 1.57 g/cm³

D: The density of the post-pressing negative electrode mixed material layer was less than 1.54 g/cm³

<Suppression of Spring Back>

The density D1 of the negative electrode mixed material layer of a negative electrode after the heating step was calculated. That negative electrode was stored at normal temperature and normal humidity for 2 weeks, and the density D2 of the negative electrode mixed material layer after the storage was calculated. The density retention rate $(=D2/D1 \times 100 \ (\%))$ was calculated and evaluated according to the following criteria. A higher density retention rate indicated that a spring back of the negative electrode had been suppressed more satisfactorily.

A: The density retention rate was 98% or greater

B: The density retention rate was 96% or greater and less than 98%

C: The density retention rate was 94% or greater and less than 96%

D: The density retention rate was less than 94%

<Peel Strength (After Pressing Step)>

A negative electrode after the pressing step was cut out into a rectangle of 100 mm in length by 10 mm in width to obtain a test piece. The test piece was placed with the surface of the negative electrode mixed material layer underneath, and cellophane tape was affixed to the surface of the negative electrode mixed material layer. Tape prescribed by JIS Z1522 was used as the cellophane tape. Moreover, the cellophane tape was fixed to a test bed. Thereafter, one end of the current collector was pulled vertically upward at a pulling speed of 50 mm/min to peel off the current collector, and the stress during this peeling was measured. This measurement was made three times and an average value of the stress was determined. The average value was taken to be a first peel strength. A greater first peel strength indicated that the negative electrode mixed material layer after the pressing step was more strongly adhered to the current collector.

A: The first peel strength was 9 N/m or greater

B: The first peel strength was 7 N/m or greater and less than 9 N/m

C: The first peel strength was 5 N/m or greater and less than 7 N/m

D: The first peel strength was less than 5 N/m

<Peel Strength (After Heating Step)>

A negative electrode after the heating step was cut out as a rectangle of 100 mm in length by 10 mm in width to obtain a test piece. Except that this test piece was employed, the stress was measured in the same manner as the section of "Peel strength (after pressing step)". This measurement was made three times and an average value of the stress was determined. ☐ The average value was taken to be a second peel strength. A greater second peel strength indicated that the negative electrode mixed material layer after the heating step was more strongly adhered to the current collector.

A: The second peel strength was 14 N/m or greater

B: The second peel strength was 12 N/m or greater and less than 14 N/m

C: The second peel strength was 10 N/m or greater and less than 12 N/m

D: The second peel strength was less than 10 N/m

Example 1

<Preparation of Polymer A>

A reaction vessel was charged with 180 parts of deionized water, 25 parts of a sodium dodecylbenzenesulfonate aqueous solution (concentration: 10%) as an emulsifier, 28 parts of acrylonitrile as a nitrile group-containing monomer, 18 parts of styrene as an aromatic vinyl monomer, 10 parts of methacrylic acid as a carboxy group-containing monomer, and 0.25 parts of t-dodecyl mercaptan as a molecular weight modifier, in this order. Then, gas inside the reaction vessel was purged three times with nitrogen and then 44 parts of 1,3-butadiene was added as an aliphatic conjugated diene monomer. Thereafter, 0.1 parts of cumene hydroperoxide as a polymerization initiator was added into the reaction vessel maintained at 10° C. to initiate a polymerization reaction, and the polymerization reaction was continued for 16 hours with stirring. Next, 0.1 parts of a hydroquinone aqueous solution (concentration: 10%) as a polymerization terminator was added to terminate the polymerization reaction. Thereafter, a rotary evaporator of a water temperature of 60° C. was used to remove residual monomers and thereby obtain a water dispersion of a polymer A (particulate polymer). The THF-insoluble content of the polymer A was measured. The results are listed in Table 1.

<Preparation of Polymer B>

A reaction vessel was charged with 150 parts of deionized water, 25 parts of a sodium dodecylbenzenesulfonate aqueous solution (concentration: 10%) as an emulsifier, 63 parts of styrene as an aromatic vinyl monomer, 4 parts of itaconic acid as a carboxy group-containing monomer, and 0.5 parts of t-dodecyl mercaptan as a molecular weight modifier, in this order. Then, gas inside the reaction vessel was purged three times with nitrogen and then 33 parts of 1,3-butadiene was added as an aliphatic conjugated diene monomer. Thereafter, 0.5 parts of potassium persulfate as a polymerization initiator was introduced into the reaction vessel maintained at 60° C. to initiate a polymerization reaction, and the polymerization reaction was continued with stirring. When the polymerization conversion rate reached 96%, the reaction vessel was cooled. Next, 0.1 parts of a hydroquinone aqueous solution as a polymerization terminator (concentration: 10%) was added to terminate the polymerization reaction. Thereafter, a rotary evaporator of a water temperature of 60° C. was used to remove residual monomers and thereby obtain a water dispersion of a polymer B (particulate polymer). The THF-insoluble content of the polymer B was measured. The results are listed in Table 1.

<Preparation of Binder Composition for Non-Aqueous Secondary Battery Negative Electrodes>

A vessel was charged with a water dispersion of the polymer A and a water dispersion of the polymer B such that ratio of the polymer A to the polymer B (polymer A:polymer B) was 30:70 in solid content ratio. The vessel was stirred for 1 hour by a three-one motor to yield a binder composition.

<Production of Slurry Composition for Non-Aqueous Secondary Battery Negative Electrodes>

A planetary mixer equipped with a disper blade was charged with 100 parts of artificial graphite (produced by Hitachi Chemical Co., Ltd.; product name: MAG-E) as a negative electrode active material, and 1 part in terms of solid content of a 1% aqueous solution of carboxymethyl cellulose (produced by Nippon Paper Chemicals Co., Ltd.; product name: MAC-350HC) as a viscosity modifier to obtain a mixture. The resultant mixture was adjusted to a solid content concentration of 58% with deionized water and was subsequently mixed for 60 minutes at 25° C. Next, the mixture was adjusted to a solid content concentration of 52% with deionized water and was then further mixed for 15 minutes at 25° C. to yield a mixed liquid. Deionized water and 2 parts in terms of solid content of the binder composition for a non-aqueous secondary battery electrode were added to the resultant mixed liquid, and the final solid content concentration was adjusted to 48%. Mixing was then continued for 10 minutes and then a defoaming process was carried out under reduced pressure to yield a slurry composition for non-aqueous secondary battery negative electrodes having good fluidity.

<Production of Negative Electrode>

The obtained slurry composition for non-aqueous secondary battery negative electrodes was applied onto copper foil (current collector) of 20 μm in thickness using a comma coater and was dried such that the mass and the density per unit area of the negative electrode mixed material layer after being dried was 9 mg/cm$^2$ and 1.05 g/cm$^3$, respectively (application step and drying step). The applied slurry composition was dried by conveying the copper foil inside a 60° C. oven for 2 minutes at a speed of 0.5 m/min. Thereafter, heat treatment was carried out for 2 minutes at 120° C. to obtain a negative electrode web prior to being subjected to a pressing step. The pressibility of an pre-pressing negative electrode mixed material layer was evaluated using that pre-pressing step negative electrode web. The results are listed in Table 1.

The pre-pressing step negative electrode web was then rolled by a roll press (pressing temperature: 25° C.) to yield a post-pressing step negative electrode having a negative electrode mixed material layer with a density of of 1.65 g/cm$^3$ (pressing step). The peel strength (after pressing step) was evaluated using this post-pressing step negative electrode. The results are listed in Table 1.

The post-pressing step negative electrode was then heated at 85° C. under a vacuum condition for 5 hours to yield a negative electrode the heating step (heating step). The peel strength (after heating step) was evaluated using this negative electrode after the heating step. The results are listed in Table 1.

<Production of Positive Electrode>

A slurry composition for non-aqueous secondary battery positive electrodes was obtained by combining 100 parts of LiCoO$_2$ having a volume average particle diameter of 12 μm as a positive electrode active material, 2 parts of acetylene black (produced by Denki Kagaku Kogyo Kabushiki Kaisha; product name: HS-100) as a conductive material, 2 parts in terms of solid content of polyvinylidene fluoride (produced by Kureha Corporation; product name: #7208) as a binder, and N-methylpyrrolidone as a solvent such as to have a total solid content concentration of 70%, and mixing these materials using a planetary mixer. These materials were mixed with a planetary mixer to yield a slurry composition for non-aqueous secondary battery positive electrodes.

The obtained slurry composition for non-aqueous secondary battery positive electrodes was applied onto aluminum foil (current collector) of 20 μm in thickness using a comma coater such that the mass per unit area of a positive electrode mixed material layer after being dried was 17 mg/cm$^2$. The applied slurry composition was dried by conveying the aluminum foil inside a 60° C. oven for 2 minutes at a speed of 0.5 m/min. Thereafter, heat treatment was carried out for 2 minutes at 120° C. to obtain a positive electrode web.

The resultant positive electrode web was rolled by a roll press to obtain a positive electrode including a positive electrode mixed material layer.

<Preparation of Separator>

A single-layer polypropylene separator (produced by Celgard, LLC.; product name: Celgard 2500) was cut out to 120 cm×5.5 cm in size.

<Production of Secondary Battery>

The post-pressing positive electrode that was obtained was cut out into a 49 cm×5 cm rectangle and was placed with the surface at the positive electrode mixed material layer side of the positive electrode on top. ▢The separator that had been cut out to 120 cm×5.5 cm in size was placed on the positive electrode mixed material layer such that the positive electrode was positioned at the longitudinal direction left-hand side of the separator. The post-pressing negative electrode that was obtained was cut out as a 50 cm×5.2 cm rectangle and was placed on the separator such that the surface at the negative electrode mixed material layer side of the negative electrode faced the separator and such that the negative electrode was positioned at the longitudinal direction right-hand side of the separator. The resultant laminate was wound by a winding machine to obtain a roll. This roll was enclosed in an aluminum packing case used as a battery case. ▫An electrolyte solution (solvent: ethylene carbonate/ diethyl carbonate/vinylene carbonate=68.5/30/1.5 (volume ratio); electrolyte: LiPF$_6$ of 1 M in concentration) was injected into the aluminum packing case such that no air remained, and then an opening of the aluminum packing case was heat sealed at 150° C. to close the aluminum packing case, and thereby produce a wound lithium ion secondary battery having a capacity of 800 mAh. This lithium ion secondary battery was then confirmed to operate normally.

Examples 2 and 3

A polymer A, a polymer B, a binder composition, a slurry composition, a negative electrode, a positive electrode, a separator, and a secondary battery were produced in the same manner as in Example 1 except that the blending ratio of the polymer A and the polymer B were modified as listed in Table 1. The evaluations were then made in the same manner as in Example 1. The results are listed in Table 1.

Examples 4 to 7

A polymer A, a polymer B, a binder composition, a slurry composition, a negative electrode, a positive electrode, a separator, and a secondary battery were produced in the same manner as in Example 1, except that the ratio of the monomers used was changed to thereby modify the composition as listed in Table 1 upon preparation of the polymer A. The evaluations were then made in the same manner as in Example 1. The results are listed in Table 1.

Example 8

A polymer A, a slurry composition, a negative electrode, a positive electrode, a separator, and a secondary battery were produced in the same manner as in Example 1, except that a water dispersion of the polymer A was used as a binder composition (in other words, no polymer B was used) upon preparation of the slurry composition. The evaluations were then made in the same manner as in Example 1. The results are listed in Table 1.

Example 9

A polymer A, a polymer B, a binder composition, a slurry composition, a negative electrode, a positive electrode, a separator, and a secondary battery were produced in the same manner as in Example 1, except that the heating temperature in the heating step was changed from 85° C. to 150° C. upon fabrication of the negative electrode. The evaluations were then made in the same manner as in Example 1. The results are listed in Table 1.

Comparative Example 1

A polymer A, a polymer B, a binder composition, a slurry composition, a negative electrode, a positive electrode, a separator, and a secondary battery were produced in the same manner as in Example 1, except that the ratio of the monomers used was changed to thereby modify the composition as listed in Table 1 upon preparation of the polymer A. The evaluations were then made in the same manner as in Example 1. The results are listed in Table 1.

Comparative Example 2

A polymer B, a slurry composition, a negative electrode, a positive electrode, a separator, and a secondary battery were produced in the same manner as in Example 1, except that a water dispersion of the polymer B was used as a binder composition (in other words, no polymer A was used) upon preparation of the slurry composition. The evaluations were then made in the same manner as in Example 1. The results are listed in Table 1.

In Table 1, shown below:
"AN" indicates acrylonitrile unit;
"BD" indicates 1,3-butadiene unit;
"ST" indicates styrene unit;
"MAA" indicates methacrylic acid unit; and
"IA" indicates itaconic acid unit.

TABLE 1

| | | | | | Example 1 | Example 2 | Example 3 | Example 4 | Example 5 | Example 6 |
|---|---|---|---|---|---|---|---|---|---|---|
| Binder compositoin | Polymer A | THF-insoluble content [% by mass] | | | 1 | 1 | 1 | 1 | 1 | 8 |
| | | Compositoin | Nitrile-group containing monomer unit | Type | AN | AN | AN | AN | AN | AN |
| | | | | Content [% by mass] | 28 | 28 | 28 | 33 | 38 | 18 |
| | | | Aliphatic conjugated diene monomer unit | Type | BD | BD | BD | BD | BD | BD |
| | | | | Content [% by mass] | 44 | 44 | 44 | 39 | 34 | 54 |
| | | | Aromatic vinyl monomer unit | Type | ST | ST | ST | ST | ST | ST |
| | | | | Content [% by mass] | 18 | 18 | 18 | 18 | 18 | 18 |
| | | | Carboxy group-containing monomer unit | Type | MAA | MAA | MAA | MAA | MAA | MAA |
| | | | | Content [% by mass] | 10 | 10 | 10 | 10 | 10 | 10 |
| | Polymer B | THF-insoluble content [% by mass] | | | 97 | 97 | 97 | 97 | 97 | 97 |
| | | Compositoin | Aromatic vinyl monomer unit | Type | ST | ST | ST | ST | ST | ST |
| | | | | Content [% by mass] | 63 | 63 | 63 | 63 | 63 | 63 |
| | | | Aliphatic conjugated diene monomer unit | Type | BD | BD | BD | BD | BD | BD |
| | | | | Content [% by mass] | 33 | 33 | 33 | 33 | 33 | 33 |
| | | | Carboxy group-containing monomer unit | Type | IA | IA | IA | IA | IA | IA |
| | | | | Content [% by mass] | 4 | 4 | 4 | 4 | 4 | 4 |
| | | Blending ratio (polymer A/polymer B) | | | 30/70 | 50/50 | 70/30 | 30/70 | 30/70 | 30/70 |
| | | Pressing temperature (pressing step) [° C.] | | | 25 | 25 | 25 | 25 | 25 | 25 |
| | | Heating temperature (heating step) [° C.] | | | 85 | 85 | 85 | 85 | 85 | 85 |
| Evaluations | | Pressibility | | | A | A | A | A | A | B |
| | | Suppression of spring back | | | A | A | A | A | A | B |
| | | Peel strength (after pressing step) | | | A | A | B | B | B | B |
| | | Peel strength (after heating step) | | | A | A | B | A | A | B |

| | | | | | Example 7 | Example 8 | Example 9 | Comparative Example 1 | Comparative Example 2 |
|---|---|---|---|---|---|---|---|---|---|
| Binder compositoin | Polymer A | THF-insoluble content [% by mass] | | | 14 | 1 | 1 | 35 | — |
| | | Compositoin | Nitrile-group containing monomer unit | Type | AN | AN | AN | AN | — |
| | | | | Content [% by mass] | 13 | 28 | 28 | 5 | — |
| | | | Aliphatic conjugated diene monomer unit | Type | BD | BD | BD | BD | — |
| | | | | Content [% by mass] | 59 | 44 | 44 | 67 | — |
| | | | Aromatic vinyl monomer unit | Type | ST | ST | ST | ST | — |
| | | | | Content [% by mass] | 18 | 18 | 18 | 18 | — |
| | | | Carboxy group-containing monomer unit | Type | MAA | MAA | MAA | MAA | — |
| | | | | Content [% by mass] | 10 | 10 | 10 | 10 | — |
| | Polymer B | THF-insoluble content [% by mass] | | | 97 | — | 97 | 97 | 97 |
| | | Compositoin | Aromatic vinyl monomer unit | Type | ST | — | ST | ST | ST |
| | | | | Content [% by mass] | 63 | — | 63 | 63 | 63 |
| | | | Aliphatic conjugated diene monomer unit | Type | BD | — | BD | BD | BD |
| | | | | Content [% by mass] | 33 | — | 33 | 33 | 33 |
| | | | Carboxy group-containing monomer unit | Type | IA | — | IA | IA | IA |
| | | | | Content [% by mass] | 4 | — | 4 | 4 | 4 |
| | | Blending ratio (polymer A/polymer B) | | | 30/70 | 100/0 | 30/70 | 30/70 | 0/100 |
| | | Pressing temperature (pressing step) [° C.] | | | 25 | 25 | 25 | 25 | 25 |
| | | Heating temperature (heating step) [° C.] | | | 85 | 85 | 150 | 85 | 85 |
| Evaluations | | Pressibility | | | B | A | A | C | D |
| | | Suppression of spring back | | | B | A | A | C | D |
| | | Peel strength (after pressing step) | | | C | C | A | D | D |
| | | Peel strength (after heating step) | | | C | B | A | C | D |

It can be observed from Table 1 that the negative electrodes having excellent peel strengths and the increased pressibilities of the pre-pressing negative electrode mixed material layers were produced in Examples 1 to 9 where the binder compositions used contained the polymer A including the aliphatic conjugated diene monomer unit and the nitrile-group containing monomer unit, and had a THF-insoluble content of 20% by mass or less. It can also be observed that the spring back of the negative electrodes was suppressed to satisfactory levels in Examples 1 to 9.

In contrast, it can be observed from Table 1 that the pressibility of the pre-pressing negative electrode mixed material layer was how and the spring back of the negative electrode could not be suppressed satisfactorily in Comparative Example 1 where the binder composition used contained the polymer A including the aliphatic conjugated diene monomer unit and the nitrile-group containing monomer unit, and had a THF-insoluble content of more than 20% by mass.

It can also be observed from Table 1 that the pressibility of the pre-pressing negative electrode mixed material layer was low and the spring back of the negative electrode could not be suppressed satisfactorily in Comparative Example 2 where the binder composition used contained no polymer A and contained the polymer B including the aliphatic conjugated diene monomer unit and the aromatic vinyl monomer unit.

INDUSTRIAL APPLICABILITY

In accordance with the present disclosure, a binder composition for a non-aqueous secondary battery electrode and a slurry composition for a non-aqueous secondary battery electrode can be provided which can improve the peel strengths of electrodes while increasing the pressibilities of pre-pressing electrode mixed material layers.

In addition, in accordance with the present disclosure, a non-aqueous secondary battery electrode having an excellent peel strength and a method of producing the same, and a non-aqueous secondary battery having the non-aqueous secondary battery electrode, can also be provided.

The invention claimed is:

1. A binder composition for a non-aqueous secondary battery electrode comprising:
   a polymer A and a polymer B,
   wherein the polymer A includes an aliphatic conjugated diene monomer unit and a nitrile-group containing monomer unit,
   the polymer A has a tetrahydrofuran-insoluble content of 20% by mass or less, and
   the polymer B including an aliphatic conjugated diene monomer unit and an aromatic vinyl monomer unit.

2. The binder composition for a non-aqueous secondary battery electrode of claim 1, wherein the polymer A includes the nitrile-group containing monomer unit in a proportion of 10% by mass or more and 40% by mass or less.

3. The binder composition for a non-aqueous secondary battery electrode of claim 1, wherein the polymer A includes the aliphatic conjugated diene monomer unit in a proportion of 20% by mass or more and 65% by mass or less.

4. A slurry composition for a non-aqueous secondary battery electrode comprising:
   an electrode active material; and
   the binder composition for a non-aqueous secondary battery electrode of claim 1.

5. A non-aqueous secondary battery electrode comprising:
   an electrode mixed material layer formed using the slurry composition for a non-aqueous secondary battery electrode of claim 4.

6. A non-aqueous secondary battery comprising:
   a positive electrode;
   a negative electrode;
   an electrolyte solution; and
   a separator, wherein
   at least one of the positive electrode and the negative electrode is the non-aqueous secondary battery electrode of claim 5.

7. A method of producing a non-aqueous secondary battery electrode, comprising the steps of:
   applying the slurry composition for a non-aqueous secondary battery electrode of claim 4 onto a current collector;
   drying the slurry composition for a non-aqueous secondary battery electrode which has been applied onto the current collector to form a pre-pressing electrode mixed material layer on the current collector; and
   pressing the pre-pressing electrode mixed material layer to form a post-pressing electrode mixed material layer, a temperature to press the pre-pressing electrode mixed material layer being 0° C. or higher and 45° C. or lower.

8. The method of producing a non-aqueous secondary battery electrode of claim 7, further comprising the step of heating the post-pressing electrode mixed material layer at 50° C. or higher and 200° C. or lower.

* * * * *